United States Patent
Wu (10) Patent No.: US 9,250,547 B2
(45) Date of Patent: *Feb. 2, 2016

(54) INTERMEDIATE TRANSFER MEMBERS AND PROCESSES

(71) Applicant: Xerox Corporation, Norwalk, CT (US)

(72) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/180,935

(22) Filed: Feb. 14, 2014

(65) Prior Publication Data

US 2015/0234299 A1  Aug. 20, 2015

(51) Int. Cl.
| | |
|---|---|
| H01B 1/04 | (2006.01) |
| G03G 7/00 | (2006.01) |
| B29C 41/00 | (2006.01) |
| B29K 79/00 | (2006.01) |
| B29K 105/16 | (2006.01) |
| B29K 507/04 | (2006.01) |
| B29K 105/00 | (2006.01) |
| B29L 29/00 | (2006.01) |

(52) U.S. Cl.
CPC .............. *G03G 7/008* (2013.01); *B29C 41/003* (2013.01); *B29K 2079/085* (2013.01); *B29K 2105/0005* (2013.01); *B29K 2105/16* (2013.01); *B29K 2507/04* (2013.01); *B29L 2029/00* (2013.01)

(58) Field of Classification Search
CPC ........... H01B 1/04; C08K 5/5406; G03G 7/00
USPC ................... 252/500–519.1, 519.31, 519.32, 252/519.33; 264/129; 399/308; 428/473.5, 428/446; 524/140
See application file for complete search history.

(56) References Cited

U.S. PATENT DOCUMENTS

| | | | | |
|---|---|---|---|---|
| 5,070,171 | A | * 12/1991 | O'Lenick, Jr. | ................. 528/33 |
| 5,487,707 | A | 1/1996 | Sharf et al. | |
| 5,774,771 | A | * 6/1998 | Kukimoto et al. | ......... 430/45.54 |
| 6,077,638 | A | * 6/2000 | Tanikawa et al. | .......... 430/106.2 |
| 6,139,784 | A | 10/2000 | Oshima et al. | |
| 6,318,223 | B1 | 11/2001 | Yu et al. | |
| 6,397,034 | B1 | 5/2002 | Tarnawskyj et al. | |
| 6,440,515 | B1 | 8/2002 | Thornton et al. | |
| 6,602,156 | B2 | 8/2003 | Schlueter, Jr. | |
| 7,031,647 | B2 | 4/2006 | Mishra et al. | |
| 7,130,569 | B2 | 10/2006 | Goodman et al. | |
| 7,139,519 | B2 | 11/2006 | Darcy, III et al. | |
| 2004/0041898 | A1* | 3/2004 | Nakamura | ..................... 347/172 |
| 2005/0074618 | A1* | 4/2005 | King et al. | ..................... 428/447 |

FOREIGN PATENT DOCUMENTS

JP   2005181753 A   *  7/2005   ............. G03G 15/16

* cited by examiner

*Primary Examiner* — Tri V Nguyen
(74) *Attorney, Agent, or Firm* — Eugene O. Palazzo (57) ABSTRACT

An intermediate transfer member that contains a mixture of a polyimide generated from a polyamic acid, an optional conductive component, and a polyethylene glycol silicone phosphate, and processes of preparation thereof.

19 Claims, 3 Drawing Sheets

Flow Diagram Figure 4 carbon black (CB)/PEG silicone phosphate
(weight ratio of from 99/1 to about 80/20)
in NMP with a total solid content of from
about 5 to about 30 weight percent)

⎯ mechanical stirring with a speed
of from about 50 to about
200 rpm for a period of from 2 to
about 8 hours at room temperatures

↓

CB/PEG silicone phosphate/NMP slurry

⎯ Add polyamic acid
mechanical stirring with a speed
of from about 50 to about
200 rpm for a period of from 6 to
about 20 hours at room temperatures

↓

CB/polyamic acid/PEG silicone phosphate
in NMP coating dispersion

⎯ Filtration via a Nylon cloth filter of
from about 20 to about
100 micron pore size

↓

CB/polyamic acid/PEG silicone phosphate
in NMP coating dispersion

FIG. 4

Flow Diagram Figure 5 carbon black (CB)/PEG silicone phosphate
(weight ratio of from 99/1 to about 80/20)
in NMP with a total solid content of from
about 5 to about 30 weight percent)

| mechanical stirring with a speed
of from about 50 to about
200 rpm for a period of from 2 to
about 8 hours at room temperatures
↓

CB/PEG silicone phosphate/NMP slurry

| Add polyamic acid
mechanical stirring with a speed
of from about 50 to about
200 rpm for a period of from 6 to
about 20 hours at room temperatures
↓

CB/polyamic acid/PEG silicone phosphate
in NMP coating dispersion

| Filtration via a Nylon cloth filter of
from about 20 to about
100 micron pore size
↓

CB/polyamic acid/PEG silicone phosphate
in NMP coating dispersion

FIG. 5

INTERMEDIATE TRANSFER MEMBERS AND PROCESSES

This disclosure is generally directed to an intermediate transfer member comprised of a polyimide, an optional conductive component or filler, and a polyethylene glycol (PEG) silicone phosphate, and processes of preparing such.

BACKGROUND

Various intermediate transfer members, such as intermediate transfer belts selected for transferring a developed image in xerographic systems, are known. For example, there are known a number of intermediate transfer members that include materials of a low unacceptable modulus or break strength, poor release characteristics from metal substrates, and which members are costly to prepare primarily because of the cost or scarcity of raw materials and lengthy drying times. Also known are intermediate transfer members with characteristics that cause these members to become brittle resulting in inadequate acceptance of the developed image and subsequent partial transfer of developed xerographic images to a substrate like paper.

A disadvantage relating to the preparation of an intermediate transfer member is that there is usually deposited on a metal substrate a separate release layer, and thereafter, there is applied to the release layer the intermediate transfer member components, and where the release layer allows the resultant intermediate transfer member to be separated from the metal substrate by peeling or by the use of mechanical devices. The use of a release layer adds to the cost and time of preparation, and such a layer can modify a number of the intermediate transfer member characteristics.

Additionally, with a number of known intermediate transfer members there are usually required three separate components, i.e. a release additive, a leveling additive and a dispersing agent, which components can cause process challenges and also add to the costs of the members.

Various milling processes are known for the preparation of dispersions that can be selected as coatings for substrates. Two known milling processes are wet milling and dry milling. To optimize these processes agitator speeds are sometimes increased, and there is used grinding media.

Utilization of milling methods, such as ball milling, can be an extremely costly and a time consuming procedure, requiring in some instances 20 to 40 hours to complete and to provide dispersions that generate a mixture with sufficient chemical, physical, and functional stability.

In one known milling method, there is selected a grinder, such as a ball mill, where an inclined or horizontal rotating cylinder is partially filled with ceramic balls, flint pebbles, and/or stainless steel balls, each of which grinds materials to the necessary fineness by friction and impact with the tumbling balls. An internal cascading effect reduces the material present to a fine powder, and where large to medium-sized ball mills are mechanically rotated on their axes. High quality ball milling processes are costly and may not be environmentally acceptable over extended usage in that grinding media residues result that need to be disposed of and that can contaminate the devices used and the materials being treated. Because of the high important speeds usually needed with ball milling there can be problems with the materials present to rotate along the direction of the cylindrical device resulting in no further grinding.

In a number of known ball milling methods, once the particles reach a certain size they can recombine at the same rate since they are being fractured, or do not fracture effectively, and therefore, do not reduce further in size. Thus, the manufacture of very fine particles by ball milling can require substantial efforts and there are also factors which consequently place limits on the minimum size of particles of active materials which can be achieved by such milling processes.

A planetary ball mill, smaller in size than common ball mills, is mainly used in laboratories for grinding sample materials down to very small particle sizes. The grinding steel balls in the grinding container are subjected to superimposed rotational movements, with the differences in speeds between the balls and grinding containers producing an interaction between frictional and impact forces, which releases high dynamic energies.

There is a need for processes that avoid the disadvantages of ball mills and ball milling processes.

Further, there is a need for economical processes where materials can be treated in a simple manner in the absence of ball milling.

Another need resides in providing processes wherein contaminates are avoided or minimized, and which processes are environmentally acceptable.

Yet another need resides in providing ball milling free and roll milling free processes for generating dispersions or coatings for substrates.

Additionally, there is a need for processes that avoid or minimize the formation of undesirable grinding media residues.

Also, another need resides in providing processes where dispersions with desirable and consistent characteristics are obtained in a direct economical manner, and that minimize the formation of contaminates.

Moreover, a further need relates to economical environmental processes that produce dispersions with properties that enable the dispersions to be selected without further treatments, for the formation of xerographic components, such as intermediate transfer members, and where roll milling and ball milling are avoided, and resulting in components with excellent chemical, physical, and functional stability.

In addition, there is a need for the direct preparation of dispersions with desirable particle sizes that are more difficult to quickly achieve with ball milling, especially as this relates to the preparation of dispersions for intermediate transfer belts, and is cleaner (more environmentally acceptable) in that grinding media residues can be avoided or minimized.

There is a need for dispersions or mixtures prepared by mechanical blending, and which dispersions can be selected for the formation of intermediate transfer members with excellent break strengths as determined by their modulus measurements, which are readily releasable from substrates, and possess high glass transition temperatures, and improved stability with no or minimal degradation for extended time periods.

Yet further there is a need for intermediate transfer members that substantially avoid or minimize the disadvantages of a number of known intermediate transfer members.

There is also a need for intermediate transfer members where a single component can function as a release additive, a leveling agent, and a dispersant that is where a polyethylene glycol silicone serves as an internal release agent, a leveling agent for the intermediate transfer member coating dispersion, and a dispersing agent for the conductive component such as carbon black.

Yet additionally, there is a need for intermediate transfer members with excellent break strengths as determined by their modulus measurements, which are readily releasable from substrates, and possess high glass transition temperatures, and improved stability with no or minimal degradation for extended time periods.

Moreover, there is a need for intermediate transfer member materials that possess rapid release characteristics from a number of substrates that are selected when such members are prepared.

Another need resides in providing intermediate transfer members that can be generated by flow coating processes, and that can be prepared by non-milling processes, thereby providing seamless intermediate transfer members that have excellent conductivity or resistivity, and that possess acceptable humidity insensitivity characteristics leading to developed images with minimal resolution issues.

Further yet there is a need for intermediate transfer members where the functionalities of a release additive, leveling agent, and dispersant or dispersing agent are accomplished by one component.

These and other needs are achievable in embodiments with the intermediate transfer members and components thereof disclosed herein.

SUMMARY

Disclosed is an intermediate transfer member comprising a layer of a polyimide, a polyethylene glycol silicone phosphate and an optional conductive component.

Also disclosed is an intermediate transfer member comprising in sequence a supporting substrate, a layer thereover comprised of a mixture of a polyimide, carbon black, and a polyethylene glycol silicone phosphate, and wherein said polyethylene glycol silicone phosphate functions as an internal release additive and a leveling agent for said polyimide, and as a dispersing agent for said carbon black, and wherein said member optionally possesses a Young's modulus of from about 5,000 to about 9,000 MPa.

Further disclosed is an intermediate transfer member that accepts a xerographic developed toner image from a photoconductor, and which member is comprised of a polyimide, a conductive component, and polyethylene glycol silicone phosphate, and wherein said polyethylene glycol silicone phosphate is represented by the following formula/structure wherein a is from about 4 to about 200, b is from about 1 to about 30, and c is from about 1 to about 40, and wherein said polyimide is represented by at least one of the following formulas/structures wherein n represents the number of repeating segments of from about 20 to about 200, and said conductive component is carbon black.

Yet further disclosed is a ball milling free and roll milling free process comprising the mechanical mixing in a solvent of a mixture of ingredients comprising a polymer, or a component that converts to a polymer, a conductive component, and a polyethylene glycol silicone phosphate.

Also disclosed is a process comprising the first mechanical mixing of a mixture of ingredients comprising a polyethylene glycol silicone phosphate, a conductive component, and a solvent to form slurry thereof, subsequently adding to the slurry a polyamic acid, followed by a second mechanical mixing of the polyamic acid containing slurry to form a dispersion.

Further disclosed is a process for the preparation of an intermediate transfer member which comprises the formation of a dispersion by the mechanical mixing of a polyethylene glycol silicone phosphate, carbon black, and a solvent; adding to the resulting mixture a polyamic acid, applying said mixture to a stainless steel substrate, curing the resulting mixture by heating wherein the polyamic acid converts to a polyimide, releasing the mixture from said substrate, and then coating said mixture obtained on a supporting substrate, and wherein said polyethylene glycol silicone phosphate is represented by the following formula/structure wherein a is from about 4 to about 200, b is from about 1 to about 30, and c is from about 1 to about 10.

FIGURES

The following Figures are provided to further illustrate the intermediate transfer members disclosed herein.

EMBODIMENTS

The terms "including", "includes", "having", "has", "with", or variants thereof are intended to be inclusive in a manner similar to the term "comprising". The term "at least one of" means, for example, that one or more of the listed items can be selected.

Any disclosed numerical value, however, inherently contains certain errors necessarily resulting from the standard deviation found in their respective testing measurements. Moreover, all ranges disclosed herein are to be understood to encompass any and all sub-ranges subsumed therein. For example, a range of from about 1 to about 10 can include any and all sub-ranges there between such as 2, 3, 4, 5, 6, 7, 8, 9, and 10, and about can include ranges below 1 and ranges above 10.

The disclosed intermediate transfer member can be comprised of a mixture of a polyimide and a polyethylene glycol silicone phosphate, which composition self releases from a metal substrate, such as stainless steel, and where an external release layer on the metal substrate can be avoided. Thus, the disclosed coating mixture is cost effective since, for example, only one component is needed for the polyimide containing intermediate transfer member mixture.

Figure 1:
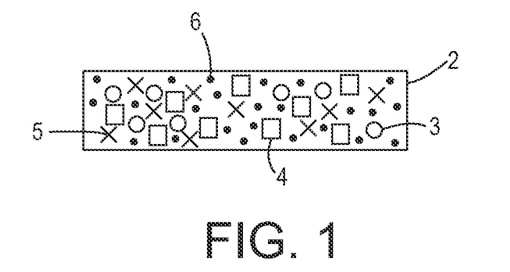
FIG. 1 illustrates an exemplary embodiment of a one-layer intermediate transfer member of the present disclosure.

In FIG. 1 there is illustrated an intermediate transfer member comprising a layer 2 comprised of a polyethylene glycol silicone phosphate 3, a polyimide 4, an optional siloxane polymer 5, and an optional conductive component 6.

Figure 2:
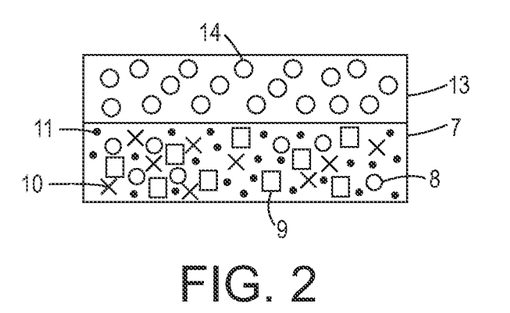
FIG. 2 illustrates an exemplary embodiment of a two-layer intermediate transfer member of the present disclosure.

In FIG. 2 there is illustrated a two-layer intermediate transfer member comprising a bottom layer 7 comprising a polyethylene glycol silicone phosphate 8, a polyimide 9, an optional siloxane polymer 10, and an optional conductive component 11, and an optional top or outer toner release layer 13 comprising release components 14.

Figure 3:
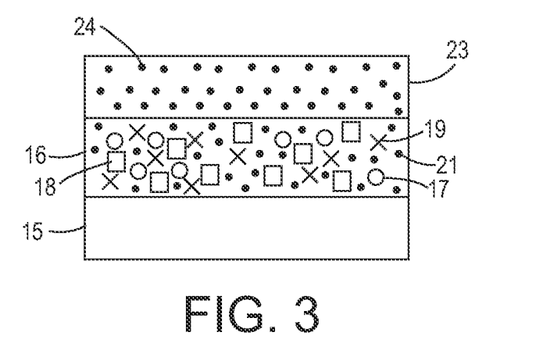
FIG. 3 illustrates an exemplary embodiment of a three-layer intermediate transfer member of the present disclosure.

In FIG. 3 there is illustrated a three-layer intermediate transfer member comprising a supporting substrate 15, a layer thereover 16 comprising a polyethylene glycol silicone phosphate 17, a polyimide 18, an optional siloxane polymer 19, and an optional conductive component 21, and an optional release layer 23 comprising release components 24.

Polyimides

Examples of polyimides selected for the intermediate transfer member mixtures illustrated herein can be formed from a polyimide precursor of a polyamic acid that includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. After curing the polyamic acid by heating the resulting polyimides include a polyimide of pyromellitic dianhydride/4,4'-oxydianiline, a polyimide of pyromellitic dianhydride/phenylenediamine, a polyimide of biphenyl tetracarboxylic dianhydride/4,4'-oxydianiline, a polyimide of biphenyl tetracarboxylic dianhydride/phenylenediamine, a polyimide of benzophenone tetracarboxylic dianhydride/4,4'-oxydianiline, a polyimide of benzophenone tetracarboxylic dianhydride/4,4'-oxydianiline/phenylenediamine, and mixtures thereof.

Commercially available examples of polyamic acids of pyromellitic dianhydride/4,4'-oxydianiline selected include PYRE-ML® RC-5019 (about 15 to 16 weight percent in N-ethyl-2-pyrrolidone, NMP), RC-5057 (about 14.5 to 15.5 weight percent in NMP/aromatic hydrocarbon=80/20), and RC-5083 (about 18 to 19 weight percent in NMP/DMAc=15/85), all available from Industrial Summit technology Corp., and Parlin, N.J.; DURIMIDE® 100, commercially available from FUJIFILM Electronic Materials U.S.A., Inc.

Polyamic acids of biphenyl tetracarboxylic anhydride/phenylenediamine examples include U-VARNISH® A, and S (about 20 weight percent in NMP), both available from UBE America Inc., New York, N.Y., BPDA resin (about 16.8 weight percent in NMP), available from Kaneka Corporation, and TX, PI-2610 (about 10.5 weight percent in NMP), and PI-2611 (about 13.5 weight percent in NMP), both available from HD MicroSystems, Parlin, N.J.

Examples of polyamic acids of benzophenone tetracarboxylic dianhydride/4,4'-oxydianiline include RP46 and RP50 (about 18 weight percent in NMP), both available from Unitech Corp., Hampton, Va.

Polyamic acids of benzophenone tetracarboxylic dianhydride/4,4'-oxydianiline/phenylenediamine examples are PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all available from HD MicroSystems, Parlin, N.J.

More specifically, polyamic acid or esters of polyamic acid examples that can be selected for the formation of polyimides are prepared by the reaction of a dianhydride and a diamine. Suitable dianhydrides selected include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl)sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis (2,3-dicarboxyphenyl)methane dianhydride, bis(3,4-dicarboxyphenyl)methane dianhydride, 4,4'-(p-phenylenedioxy) diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acids include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl] ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like, and mixtures thereof.

The dianhydrides and diamines are, for example, selected in a weight ratio of from about 20:80 to about 80:20, a weight ratio of from about 60/40 to about 40/60, and about a 50:50 weight ratio.

Polyimide examples selected for the disclosed intermediate transfer member layer mixtures are represented by at least one of the following formulas/structures, and mixtures thereof.

where n represents the number of repeating segments of, for example, from about 5 to about 3,000, from about 50 to about 2,000, from about 50 to about 1,500, from about 200 to about 1,200, from about 1,000 to about 2,000, from about 1,200 to about 1,800, from about 20 to about 200, or from about 30 to about 100.

Polyethylene Glycol Silicone Phosphates

Polyethylene glycol silicone phosphates selected for the disclosed intermediate transfer members include SilSense® PE-100 silicones obtainable from Lubrizol Corporation. The acid values of these polyethylene glycol silicone phosphates are reported as being, for example, from about 10 mg KOH/g (milligrams per gram) to about 100 mg KOH/g, or from about 20 mg KOH/g to about 80 mg KOH/g. The corresponding salts of the acidic polyethylene glycol silicone phosphates can also be selected for the intermediate transfer members and included processes of the present disclosure, such as the polyethylene silicone phosphates in a sodium salt form.

Examples of polyethylene glycol silicone phosphates obtainable from Lubrizol Corporation, and selected for the intermediate transfer members and processes disclosed herein are illustrated with reference to the following formula/structure wherein a, b, and c are the number of the corresponding repeating units. More specifically, the value of a is, for example, from about 4 to about 200, from about 10 to about 175, from about 25 to about 150, from about 20 to about 100, from about 6 to about 100, or from about 10 to about 50; the value of b is, for example, from about 1 to about 30, from about 1 to about 20, from about 1 to about 12, from about 2 to about 10, or from about 2 to about 5; and the value of c is, for example, from about 1 to about 40, from about 1 to about 30, from about 1 to about 15, from about 2 to about 20, from about 2 to about 10, or from about 2 to about 8.

Specific examples of polyethylene glycol silicone phosphate selected for the disclosed intermediate transfer members, and available from Lubrizol Corporation are of the following formula/structure wherein a and b are the values as disclosed herein, and c, not shown in this specific formula but shown in the general formula disclosed herein, is represented, for example, by 8. Also, for this specific formula, a can be, for example, about 50 and b can be, for example, about 5. Various amounts of a polyethylene glycol silicone phosphate can be selected for the disclosed intermediate transfer member, such as for example, from about 0.01 weight percent to about 5 weight percent (of the solids throughout), from about 0.1 to about 1 weight percent, from about 0.1 to about 0.9 weight percent, from about 0.1 to about 1.5 weight percent, from about 0.03 to about 0.4 weight percent, from about 0.03 to about 0.1 weight percent, from about 0.01 to about 0.5 weight percent, from about 0.01 to about 0.05 weight percent, from about 0.01 to about 5 weight percent, or where the amount is less than or equal to about 0.6 weight percent, and where the total of the solids is about 100 percent. In embodiments, the intermediate transfer member composition of the polyimide polymer generated from a polyamic acid and the polyethylene glycol silicone phosphate are present, for example, in a weight ratio of from about 99.99/0.01 to about 95/5 with the polyimide/conductive component/polyethylene glycol silicone phosphate weight ratio being, for example, from about 50/49.99/0.01 to about 94.9/5/0.1 or about 94.9/0.11/5, and more specifically, about 88.45/11/0.55.

The disclosed polyimide/polyethylene glycol silicone phosphate containing mixture possesses, for example, a Young's modulus of from about 4,000 to about 10,000 MPa, from about 5,000 to about 10,000 MPa, from about 6,500 to about 7,500 MPa, from about 6,000 to about 10,000 MPa, from about 7,800 to about 7,900 MPa, and from about 7,500 to about 8,000 MPa; and an onset decomposition temperature of greater than about 150° C. inclusive of from about 400° C. to about 650° C., from about 500° C. to about 640° C., from about 600° C. to about 630° C., from about 160° C. to about 400° C., and from about 170° C. to about 350° C.

For the glass transition temperatures they can be determined by a number of known methods, and more specifically, by Differential Scanning calorimetry (DSC). For the disclosed molecular weights, such as $M_w$ (weight average) and $M_n$ (number average), they can be measured by a number of known methods, and more specifically, by Gel Permeation Chromatography (GPC).

The polyethylene glycol silicone phosphates, which can simultaneously function as a release agent or additive, a leveling agent, and also as a dispersing agent for the conductive component, such as carbon black, in contrast to utilizing three different substances, are compatible with the coating solution containing the polyimides and optional components. Additionally, the resulting polyimide/polyethylene glycol silicone phosphate containing mixtures or compositions, after final curing, self-release from a metal substrates like stainless steel and a thick smooth polyimide/conductive component when present polyethylene glycol silicone phosphate composition intermediate transfer member can be obtained.

Optional Conductive Components or Fillers

The disclosed intermediate transfer member may optionally contain one or more conductive components or fillers to, for example, alter and adjust the conductivity of the intermediate transfer member. Where the intermediate transfer member is a one layer structure, the conductive filler can be included in the mixture containing the polyethylene glycol silicone phosphates disclosed herein. However, where the intermediate transfer member is a multi-layer structure, the conductive filler can be included in one or more layers of the member, such as in the supporting substrate, the release layer when present, or mixtures thereof coated thereon, or in both the supporting substrate and the release layer.

Suitable conductive components include carbon blacks, metal oxides, polyanilines, graphite, acetylene black, fluorinated carbon blacks, other known suitable fillers, and mixtures thereof.

Examples of carbon blacks that can be selected for the intermediate transfer members illustrated herein include special black 4 (B.E.T. surface area=180 m²/g, DBP absorption=1.8 ml/g, primary particle diameter=25 nanometers) available from Evonik-Degussa, special black 5 (B.E.T. surface area=240 m²/g, DBP absorption=1.41 ml/g, primary particle diameter=20 nanometers), color black FW1 (B.E.T. surface area=320 m²/g, DBP absorption=2.89 ml/g, primary particle diameter=13 nanometers), color black FW2 (B.E.T. surface area=460 m²/g, DBP absorption=4.82 ml/g, primary particle diameter=13 nanometers), color black FW200 (B.E.T. surface area=460 m²/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m²/g, DBP absorption=1.05 ml/g), 880 (B.E.T. surface area=240 m²/g, DBP absorption=1.06 ml/g), 800 (B.E.T. surface area=230 m²/g, DBP absorption=0.68 ml/g), L (B.E.T. surface area=138 m²/g, DBP absorption=0.61 ml/g), 570 (B.E.T. surface area=110 m²/g, DBP absorption=1.14 ml/g), 170 (B.E.T. surface area=35 m²/g, DBP absorption=1.22 ml/g), VULCAN® XC72 (B.E.T. surface area=254 m²/g, DBP absorption=1.76 ml/g), XC72R (fluffy form of VULCAN® XC72), XC605, XC305, REGAL® 660 (B.E.T. surface area=112 m²/g, DBP absorption=0.59 ml/g), 400 (B.E.T. surface area=96 m²/g, DBP absorption=0.69 ml/g), 330 (B.E.T. surface area=94 m²/g, DBP absorption=0.71 ml/g), MONARCH® 880 (B.E.T. surface area=220 m²/g, DBP absorption=1.05 ml/g, primary particle diameter=16 nanometers), and 1000 (B.E.T. surface area=343 m²/g, DBP absorption=1.05 ml/g, primary particle diameter=16 nanometers); channel special carbon black 4 and channel special carbon black 5 available from Orion, and Channel carbon blacks available from Evonik-Degussa. Other known suitable carbon blacks not specifically disclosed herein may be selected as the filler or conductive component for the intermediate transfer members disclosed herein.

Examples of polyaniline fillers that can be selected for incorporation into the intermediate transfer members are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer members include, for example, tin oxide, antimony doped tin oxide, antimony dioxide, titanium dioxide, indium oxide, zinc oxide, indium-doped tin trioxide, indium tin oxide, and titanium oxide.

Suitable antimony doped tin oxide fillers include antimony doped tin oxides coated on an inert core particle, such as ZELEC® ECP-S, M and T, available from DuPont Chemicals, Jackson Laboratories, Deepwater, N.J., and those antimony doped non-core containing tin oxides, such as ZELEC® ECP-3005-XC and ZELEC® ECP-3010-XC; available from DuPont Chemicals, Jackson Laboratories, Deepwater, N.J. The core particle may be mica, $TiO_2$ or acicular particles having a hollow or a solid core.

Commercially available from E.I. DuPont or DuPont Chemicals examples of antimony doped tin oxide fillers are ZELEC® ECP 1610-S, 2610-S, 3610-S, 1703-S, 2703-S, 1410-M, 3005-XC, 3010-XC, 1410-T, 3410-T, S-X1, ZELEC® ECP powders that include an acicular hollow shell, an equiaxial titanium dioxide core product (ZELEC® ECP-T), and a plate shaped mica core product (ZELEC® ECP-M).

The antimony doped tin oxide particles can be prepared by densely layering a thin layer of antimony doped tin oxide onto the surface of a silica shell or silica-based particle, wherein the shell, in turn, has been deposited onto a core particle. Also, the antimony doped tin oxide particles are fine enough in size to provide adequate transparency. The silica may either be a hollow shell or layered on the surface of an inert core to form a solid structure.

When present, the conductive component can be selected in an amount of, for example, from about 0.1 to about 50 weight percent, from about 1 to about 60 weight percent, from about 1 to about 40 weight percent, from about 3 to about 40 weight percent, from about 4 to about 30 weight percent, from about 10 to about 30 percent, from about 10 to about 25 weight percent, from about 5 to about 30 weight percent, from about 15 to about 20 weight percent, or from about 5 to about 20 weight percent based on the total of the solid ingredients in which the filler is included.

Optional Polysiloxane Polymers

The intermediate transfer member disclosed mixtures can also generally comprise a polysiloxane polymer. Examples of polysiloxane polymers selected for the intermediate transfer member mixtures disclosed herein include known suitable polysiloxanes, such as a copolymer of a polyether and a polydimethylsiloxane, commercially available from BYK Chemical as BYK® 333, 330 (about 51 weight percent in methoxypropylacetate), and 344 (about 52.3 weight percent in xylene/isobutanol, ratio of 80/20); BYK®-SILCLEAN 3710 and 3720 (about 25 weight percent in methoxypropanol); a copolymer of a polyester and a polydimethylsiloxane, commercially available from BYK Chemical as BYK® 310 (about 25 weight percent in xylene), and 370 (about 25 weight percent in xylene/alkylbenzenes/cyclohexanone/monophenylglycol, ratio of 75/11/7/7); a copolymer of a polyacrylate and a polydimethylsiloxane, commercially available from BYK Chemical as BYK®-SILCLEAN 3700 (about 25 weight percent in methoxypropylacetate); a copolymer of polyester polyether and a polydimethylsiloxane, commercially available from BYK Chemical as BYK® 375 (about 25 weight percent in di-propylene glycol monomethyl ether); and mixtures thereof.

The polysiloxane polymer, or copolymers thereof can be included in the disclosed coating compositions and intermediate transfer members thereof in an amount of, for example, from about 0.1 to about 10 weight percent, from about 0.01 to about 1 weight percent, from about 0.05 to about 1 weight percent, from about 0.05 to about 0.5 weight percent, from about 0.1 to about 0.5 weight percent, from about 0.2 to about 0.5 weight percent, or from about 0.1 to about 0.3 weight percent based on the total weight of the solid components or ingredients present.

Optional Supporting Substrates

If desired, a supporting substrate can be included in the intermediate transfer member, such as beneath the disclosed polyethylene glycol silicone phosphate containing mixture layer. The supporting substrate can be included to provide increased rigidity or strength to the intermediate transfer member.

The disclosed polyethylene glycol silicone phosphate containing coating dispersion can be applied on various suitable supporting substrate materials to form dual layer intermediate transfer members. Exemplary supporting substrate materials include polyimides, polyamideimides, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like. The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Specific examples of polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Optional Release Layers

When desired, an optional release layer can be included in the intermediate transfer member, such as in the configuration of a layer over the disclosed polyethylene glycol silicone phosphate mixture containing layer. The release layer can be included to assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, from about 10 to about 75 microns, or from about 20 to about 50 microns.

The optional release layer can comprise TEFLON®-like materials including fluorinated ethylene propylene copolymers (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., polydimethyl siloxane/dibutyl tin diacetate, 0.45 gram DBTDA per 100 grams polydimethyl siloxane rubber mixture with a molecular weight $M_w$ of approximately 3,500; and fluoroelastomers, such as those available as VITON®, such as copolymers and terpolymers of vinylidenefluoride, hexafluoropropylene, and tetrafluoroethylene, which are known commercially under various designations as VITON® A, E, E60C, E45, E430, B910, GH, B50, and GF. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON® A; (2) a class of terpolymers of vinylidenefluoride, hexafluoropropylene, and tetrafluoroethylene, known commercially as VITON® B; and (3) a class of tetrapolymers of vinylidenefluoride, hexafluoropropylene, tetrafluoroethylene, and a cure site monomer, such as VITON® GF, having 35 mole percent of vinylidenefluoride, 34 mole percent of hexafluoropropylene, and 29 mole percent of tetrafluoroethylene with 2 percent cure site monomer. The cure site monomers can be selected from those available from E.I. DuPont de Nemours, Inc. such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomers.

Intermediate Transfer Member Preparation

The disclosed intermediate transfer member coating dispersions can be prepared by a number of known processes. One method for the preparation of the disclosed coating compositions involves mechanical stirring and with no ball milling, and where the polyethylene glycol silicone phosphate release additive/leveling agent/dispersing agent can be initially mixed with a conductive component like carbon black, and a solvent with no polyamic acid perturbation. Subsequently, a polyamic acid can then be added to the mixture resulting.

Dispersion Processes

Dispersions of the present disclosure can be prepared by simple mechanical mixing processes, and in the absence of ball milling and roll milling.

In an embodiment of the present disclosure, the mechanical mixing process comprises providing or preparing a composition of a polymer, or a component that converts to a polymer, a conductive component, a polyethylene glycol silicone phosphate, and a solvent, and subjecting the resulting mixture to mechanical agitation, followed by filtration to form a dispersion. More specifically, the process of the present disclosure comprises the mechanical mixing of a conductive component, a polyethylene glycol silicone phosphate, and a solvent to form a slurry, adding a polymer, or a component that converts to a polymer to the slurry, subjecting the slurry formed to mechanical mixing, and then optionally filtering the resulting dispersion.

The disclosed mechanical mixing can be accomplished at suitable temperatures, such as room temperature of from about 22° C. to about 25° C. with known mixing devices, commercially available, and where, for example, there is selected a magnetic stirrer, a vibrating stirrer, hand stirring with an elongated rod, such as a glass rod, shaking the mixture, repeatedly transferring the mixture from one container or flask to another container or flask, automatic controlled stirring using at least one paddle, hand stirring using at least one paddle, combinations thereof, and the like. In an embodiment of the present disclosure, there can be utilized for the mechanical mixing of the compositions an IKA RW20 Digital Mechanical Stirrer available from Fisher Scientific.

The mechanical mixing can be effected by a magnetic stirrer, a vibrating stirrer, hand stirring with an elongated rod, shaking the mixture, repeatedly transferring the mixture from one container to another container, automatic controlled stirring using at least one paddle, or hand stirring using at least one paddle, and optionally wherein the component that converts to a polymer is a polyamic acid. For the mechanical mixing, it can be accomplished with stirring at a stirring speed of, for example, from about 50 to about 250 revolutions per minute for a period of time of, for example, from about 1 to about 25 hours, or with stirring at a stirring speed of, for example, from about 50 to about 200 revolutions per minute for a period of time of from about 2 to about 20 hours, or with stirring at a stirring speed of from about 50 to about 200 revolutions per minute for a period of time of from about 2 to about 8 hours, thereby forming a slurry, followed by a second mixing with stirring at a stirring speed of, for example, from about 50 to about 200 revolutions per minute for a time period of from about 4 to about 25 hours, and wherein the component that converts to a polyimide is a polyamic acid, or where the mechanical mixing comprises a first mixing with stirring at a stirring speed of from about 75 to about 175 revolutions per minute for a period of time of from about 2 to about 8 hours thereby forming a slurry, followed by a second mixing with stirring at a stirring speed of from about 50 to about 200 revolutions per minute for a period of time of from about 6 to about 20 hours, and subsequently filtering the resulting dispersion with a filter with a pore size of, for example, from about 20 to about 100 microns.

Mechanical stirring speeds can vary depending, for example, on the components being mixed and the devices selected. Generally, stirring speeds and stirring times are selected that will permit the initial formation of slurries, and then the generation of dispersions from the formed slurry. Examples of stirring speeds are from about 50 to about 250 revolutions per minute (RPM), from about 50 to about 200 revolutions per minute, from about 75 to about 175 revolutions per minute, from about 100 to about 150 revolutions per minute, from about 105 to about 135 revolutions per minute, and from about 115 to about 125 revolutions per minute.

The stirring times are dependent on a number of factors, such as the components and amounts thereof present, the stirring mechanism selected, the process sequence, that is the formation of a slurry and the formation of the dispersion, and the specific stirring devices used. However, generally the stirring times are from about 1 to about 25 hours, from about 5 to about 20 hours, from about 6 to about 20 hours, from about 2 to about 8 hours, and from about 3 to about 7 hours. For the generation of a slurry, the more specific stirring times can be from about 2 to about 8 hours and from 4 to about 7 hours. From about 4 to about 25 hours and from about 6 to about 20 hours of stirring time can be selected for converting the slurry into a dispersion. The resulting dispersion can then be filtered with various known filters, such as paper and cloth filters with suitable pore sizes of, for example, from about 15 to about 150 microns, from about 20 to about 100 microns, and from about 35 to about 75 microns.

More specifically, the disclosed mixtures can be prepared in accordance with the following Scheme where a mixture of carbon black (CB), a polyethylene glycol silicone phosphate combination release additive/leveling agent/dispersing agent, available from Lubrizol, contained in the disclosed solvents, such as N-methyl pyrrolidone (NMP), can be stirred to form a slurry thereof. There can be added to the formed slurry a polymer or a component that converts to a polymer, such as a polyamic acid, followed by mechanical stirring, and where there results a polymer or polyamic acid/carbon black/polyethylene glycol silicone phosphate/NMP coating dispersion, which dispersion can then be filtered to form the final coating dispersion.

Figure 4:
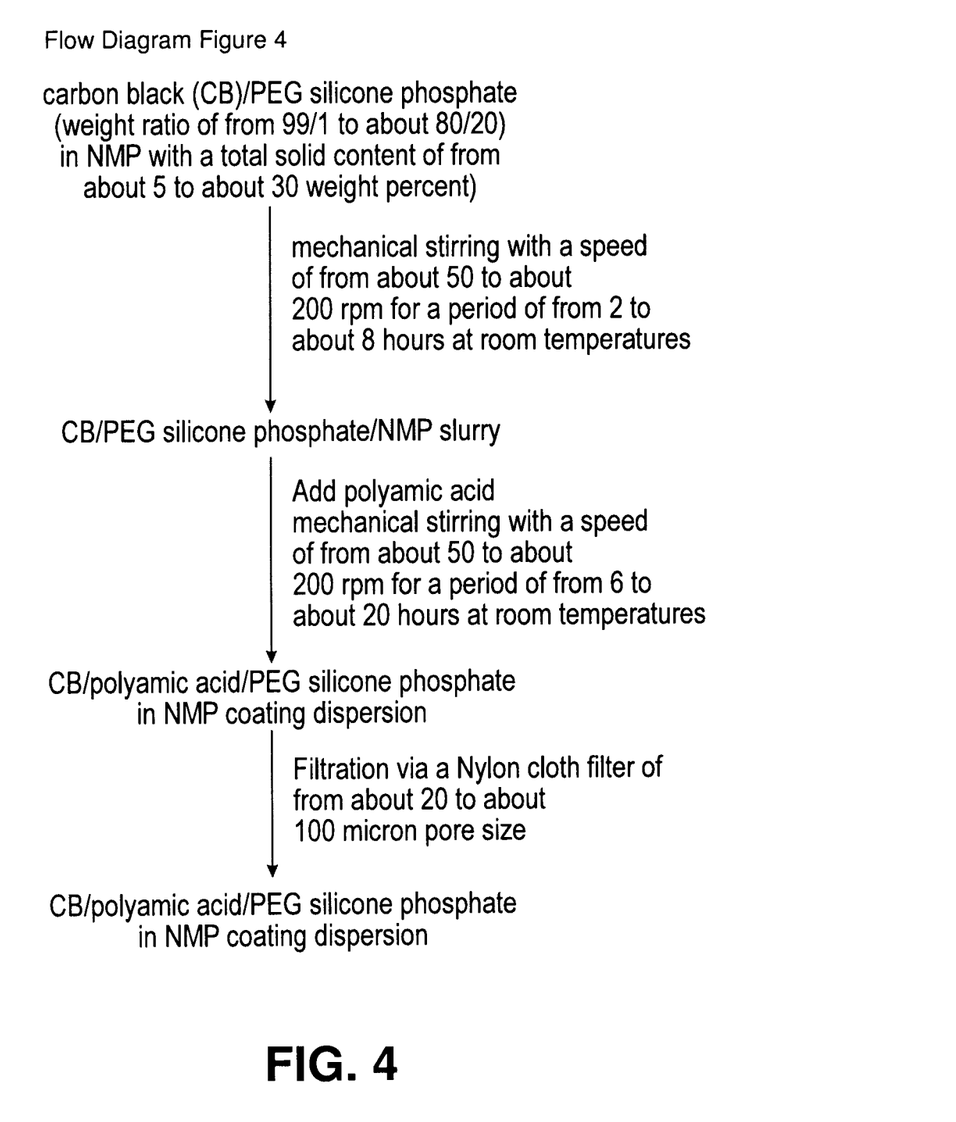
FIG. 4 illustrates an exemplary embodiment of a Scheme or Flow Diagram for the generation of a coating composition dispersion selected for an intermediate transfer member of the present disclosure.

The disclosed intermediate transfer coating, such as an intermediate transfer belt (ITB) dispersion mixture, can be prepared in accordance with the FIG. 4 Scheme or Flow Diagram where a mixture of carbon black, the polyethylene glycol silicone phosphate combination release additive/leveling agent/dispersing agent, available from Lubrizol, contained in the disclosed solvents, such as NMP, can be stirred to form a slurry thereof. Subsequently, there can be added to the formed slurry a polyamic acid followed by stirring, and where there results a polyamic acid/carbon black/polyethylene glycol silicone phosphate/NMP coating dispersion, which dispersion can then be filtered.

The above prepared final intermediate transfer belt (ITB) liquid coating dispersion mixture can then be flow coated on a metal substrate like a stainless steel substrate, aluminum, nickel, copper, and alloys thereof, and glass plates, and subsequently cured by heating at, for example, from about 50° C. to about 75° C. for from about 25 to about 35 minutes, followed by heating at from about 180° C. to about 195° C. for about from about 25 to about 35 minutes, and then further heating at from about 300° C. to about 325° C. for from about 50 minutes to about 65 minutes. The resulting polyimide intermediate transfer member film with a flat configuration, and with no curl, after drying and cooling to room temperature, about 22° C. to about 25° C., readily released without the assistance of any external processes from the metal substrate. That is, the intermediate transfer member films obtained immediate release, or self-release, such as for example, within from about 1 to about 15 seconds, from about 1 to about 10 seconds, from about 5 to about 15 seconds, from about 5 to about 10 seconds, or about 1 second without any external assistance, from the metal substrate, such as a stainless steel substrate. Also, the efficiently and economically formed intermediate transfer member film will fully separate, such as for example, a separation of from about 90 to about 100 percent, or from about 95 to about 99 percent from metal substrates, and where release materials and separate release layers can be avoided.

The self-released disclosed intermediate transfer member coating dispersion mixture can be selected as an intermediate transfer member or the film resulting can be coated on the optional supporting substrates illustrated herein by liquid spray coating, dip coating, wire wound rod coating, fluidized bed coating, powder coating, electrostatic spraying, sonic spraying, blade coating, molding, laminating, and the like. The optional supporting substrate can be formed in various shapes, such as a belt, or a film using suitable materials that are non-conductive or conductive with the thickness of the intermediate transfer member being, for example, from about 30 to about 1,000 microns, from about 100 to about 800 microns, from about 150 to about 500 microns, from about 100 to about 125 microns, or from about 75 to about 80 microns. In embodiments, the intermediate transfer film coating mixture subsequent to curing can have a thickness of, for example, from about 30 to about 400 microns, from about 15 to about 150 microns, from about 20 to about 100 microns, from about 50 to about 200 microns, from about 70 to about 150 microns, or from about 25 to about 75 microns.

A solvent can be included in the polyimide/polyethylene glycol silicone phosphate containing coating mixture. Examples of the solvents selected are, for example, toluene, hexane, cyclohexane, heptane, tetrahydrofuran, methyl ethyl ketone, methyl isobutyl ketone, N,N'-dimethylformamide, N,N'-dimethylacetamide, N-methyl pyrrolidone (NMP), methylene chloride, and mixtures thereof, where the solvent is selected in, for example, an amount of from about 70 weight percent to about 95 weight percent, or from 80 weight percent to about 90 weight percent based on the amounts of components in the coating mixture.

Specific embodiments will now be described in detail. These examples are intended to be illustrative, and not limited to the materials, conditions, or process parameters set forth in these embodiments. All parts are percentages by solid weight unless otherwise indicated.

Comparative Example 1

There was prepared a coating dispersion of a polyamic acid, which polyamic acid converts after curing by heating into the polyimide of biphenyl tetracarboxylic dianhydride/phenylenediamine of the following formula/structure wherein n is about 30.

More specifically, an intermediate transfer coating dispersion was prepared by providing a mixture of Special Carbon Black 4, available from Orion Chemicals, the solvent N-ethyl-2-pyrrolidone (NMP), the polyamic acid of biphenyl tetracarboxylicdianhydride/phenylenediamine, and the leveling agent NOVEC™ FC-4432, a fluoro surfactant available from 3M, about 18 weight percent of solids, and which mixture was stirred and subjected to ball milling with 2 millimeter stainless steel shots via an Attritor grinding mill for 18 hours at a speed of about 200 rpm for 48 hours. There resulted a coating dispersion of the polyamic acid of biphenyl tetracarboxylicdianhydride/phenylenediamine/carbon black/leveling agent contained in NMP, where the weight ratio of polyamic acid of biphenyl tetracarboxylicdianhydride/phenylenediamine/carbon black/leveling agent was 88.8/11/0.2, and which dispersion was filtered through a 20 micron Nylon cloth filter.

The above prepared final liquid coating dispersion was flow coated on a stainless steel substrate, and subsequently cured at 75° C. for 30 minutes, 190° C. for 30 minutes, and then 320° C. for 60 minutes followed by drying to room temperature, about 25° C. The resulting intermediate transfer belt comprised of polyimide/carbon black/leveling agent with the weight ratio of 88.8/11/0.2, thickness of 50 microns, did not release from the coating substrate until after being submerged into water for a month.

Example I

Figure 5:
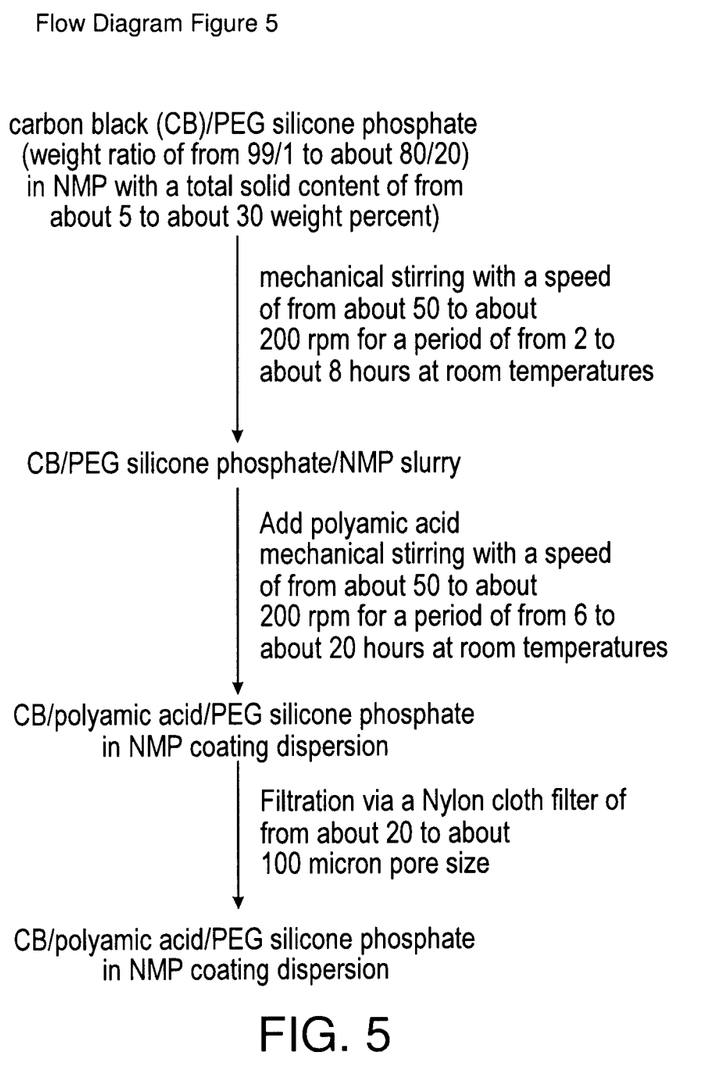
FIG. 5 illustrates an exemplary embodiment of a Scheme or Flow Diagram for the generation of a coating composition dispersion selected for an intermediate transfer member of the present disclosure.

With mechanical mixing and in the absence of the ball milling of the Comparative Example 1 (utilized 2 millimeter stainless steel shots via an Attritor grinding mill) for only 3 hours with a stirring blade connected to an elongated rod, an intermediate transfer coating dispersion was prepared in accordance with the FIG. 5 Scheme or Flow Diagram, where ITB means intermediate transfer belt, and where there was selected a mixture of Special Carbon Channel Black 4, available from Orion Chemicals, the polyethylene glycol silicone phosphate release additive/leveling agent/dispersing agent PEG silicone phosphate (SilSense® PE-100) of the following structure where a is 50 and b is 5, available from Lubrizol, in NMP, about 16.5 weight percent solids, and with no polyamic acid perturbation.

Subsequently, there was added to the formed slurry the polyamic acid of biphenyl tetracarboxylicdianhydride/phenylenediamine, followed by mechanical stirring with a stirring blade connected to an elongated rod, and at a stirring speed of 100 revolutions per minute for 18 hours, after which there resulted a coating dispersion, which dispersion was readily filtered with a 20 micron Nylon cloth filter. The polyamic acid/carbon black/polyethylene glycol silicone phosphate weight ratio was 88.45/11/0.55.

There resulted a final coating dispersion without the formation of undesirable grinding residues, and at a cost of about 70 percent less than the Comparative Example 1 dispersion ball milling process.

The above prepared final liquid coating dispersion was flow coated on a stainless steel substrate, and subsequently cured at 75° C. for 30 minutes, 190° C. for 30 minutes, and then 320° C. for 60 minutes followed by drying to room temperature, about 25° C. The resulting intermediate transfer belt comprised of polyimide/carbon black/polyethylene glycol silicone phosphate with the weight ratio of 88.45/11/0.55, thickness of 50 microns, with a flat configuration, and with no curl, self-released without the assistance of any external processes, in about 5 seconds, from the stainless steel substrate and possessed excellent surface properties. Accomplishing self-release within a range of from about 1 to about 10 seconds is highly desirable.

The polyamic acid converted into the polyimide of biphenyl tetracarboxylic dianhydride/phenylenediamine of the following formula/structure wherein n is about 30.

Measurements

The coefficient of thermal expansion (CTE) of the above intermediate transfer members of Comparative Example 1 and Example I was measured using a Thermo-Mechanical Analyzer (TMA). The samples were cut using a razor blade and metal die to 4-millimeter wide pieces which were then mounted between the TMA clamps using the 8-millimeter spacing. The samples were pre-loaded to a force of 0.05 N. The CTE values were obtained as a linear fit through the data between −20° C. to 50° C. using the TMA software.

Young's Modulus was measured following the known ASTM D882-97 process. Samples (0.5 inch×12 inch) of each intermediate transfer member were placed in a commercially available InstronTensile Tester measurement apparatus, and then the samples were elongated at a constant pull rate until breaking. During this time, there was recorded the resulting load versus the sample elongation. The Young's Modulus value was calculated by taking any point tangential to the initial linear portion of the recorded curve results, and dividing the tensile stress by the corresponding strain. The tensile stress was calculated by dividing the load by the average cross sectional area of each of the test samples. The tensile stress at which the sample strip broke was recorded as break strength.

The above ITB members of Comparative Example 1 and Example I were measured for surface resistivity (averaging four to six measurements at varying spots, 72° F./65 percent room humidity) using a High Resistivity Meter (Hiresta-Up MCP-HT450 available from Mitsubishi Chemical Corp.).

The following results were obtained.

| Example Number | CTE (ppm/° K.) | Young's Modulus (MPa) | Break Strength (MPa) | Resistivity (ohm/square) |
|---|---|---|---|---|
| Comparative Example 1 | 30.0 | 6,000 | 163 | $5.6 \times 10^{10}$ |
| Example I | 20.3 | 7,540 | 181 | $3.3 \times 10^{10}$ |

The coating dispersion of Example I was prepared with no milling where the disclosed polyethylene glycol silicone phosphate was an excellent dispersing agent for carbon black, and where there was an absence of undesirable grinding media residues. In contrast, the Comparative Example 1 coating dispersion was prepared by ball milling, which was a complex and energy-consuming process, and where there were formed undesirable grinding media residues.

The Example I intermediate transfer belt (ITB) self-released from the coating substrate due to the presence of the polyethylene glycol silicone phosphate. In contrast, the Comparative Example 1 ITB did not release from the coating substrate until after being submerged into water for a month.

In addition, the resulting intermediate transfer member of Example I showed improved stability and mechanical properties, such as about 30 percent higher modulus, about 20 percent higher break strength, and about 20 percent lower CTE versus the Comparative Example 1 intermediate transfer member.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a layer of a mixture of a polyimide, a polyethylene glycol silicone phosphate a conductive component, and an optional polysiloxane polymer, wherein said polyethylene glycol silicone phosphate is represented by the following formulas/structures wherein a is from about 4 to about 200, b is from about 1 to about 30, and c is from about 1 to about 40 and said conductive component is selected from the group consisting of carbon blacks, metal oxides, polyanilines, and mixtures thereof.

2. An intermediate transfer member in accordance with claim 1 wherein said polyethylene glycol silicone phosphate is acidic, and said conductive component is carbon black.

3. An intermediate transfer member in accordance with claim 1 wherein said polyethylene glycol silicone phosphate is present in an amount of from about 0.01 to about 5 weight percent of total solids, and said conductive component is carbon black.

4. An intermediate transfer member in accordance with claim 1 wherein said polyethylene glycol silicone phosphate is present in an amount of from about 0.1 to about 2.6 weight percent of total solids, and said conductive component is carbon black.

5. An intermediate transfer member in accordance with claim 1 where for said polyethylene glycol silicone phosphate a is 50 and b is 5.

6. An intermediate transfer member in accordance with claim 1 wherein a is from about 6 to about 100, b is from about 2 to about 10, and c is from about 2 to about 20.

7. An intermediate transfer member in accordance with claim 1 wherein said polyethylene glycol silicone phosphate possesses an acid value of from about 10 to about 100 mg KOH/g.

8. An intermediate transfer member in accordance with claim 1 wherein said polyethylene glycol silicone phosphate is present in an amount of from about 0.1 to about 1 weight percent of total solids.

9. An intermediate transfer member in accordance with claim 1 wherein said polyimide is represented by at least one of the following formulas/structures and wherein n represents the number of repeating segments of from about 20 to about 200.

10. An intermediate transfer member in accordance with claim 1 wherein said polyimide is represented by the following formula/structure wherein n is about 30.

11. An intermediate transfer member in accordance with claim 1 with a Young's modulus of from about 4,000 to about 10,000 MPa, and wherein said member self-releases from a supporting substrate of a metal subsequent to being deposited on said metal, and optionally which self-release is accomplished in from about 1 to about 10 seconds.

12. An intermediate transfer member in accordance with claim 1 wherein said polyimide and said polyethylene glycol silicone phosphate are present in a weight ratio of from about 99.99/0.01 to about 95/5, and optionally wherein said polyimide is represented by the following formula/structure wherein n represents the number of repeating segments of from about 20 to about 200.

13. An intermediate transfer member in accordance with claim 1 with a Young's modulus of from about 5,000 to about 9,000 MPa.

14. An intermediate transfer member in accordance with claim 1 wherein said conductive component is carbon black, and said polyethylene glycol silicone phosphate functions as a dispersing agent for said carbon black.

15. An intermediate transfer member in accordance with claim 1 wherein the weight ratio of said polyimide/conductive component/polyethylene glycol silicone phosphate is from about 50/49.99/0.01 to about 94.4/5/0.6.

16. An intermediate transfer member in accordance with claim 1 wherein said polyethylene glycol silicone phosphate simultaneously functions as an internal release additive, a leveling agent, and a dispersing agent.

17. An intermediate transfer member consisting of and in sequence a supporting substrate, a layer thereover comprised of a mixture of a polyimide, carbon black, and a polyethylene glycol silicone phosphate, and wherein said member possesses a Young's modulus of from about 5,000 to about 9,000 MPa, wherein said polyethylene glycol silicone phosphate is represented by the following formulas/structures wherein a is from about 4 to about 200, and b is from about 1 to about 30, and optionally wherein said polyimide is represented by the following formula/structure wherein n represents the number of repeating segments of from about 20 to about 200.

18. An intermediate transfer member in accordance with claim 17 that accepts a xerographic developed toner image from a photoconductor,
wherein said polyimide is represented by at least one of the following formulas/structures and wherein n represents the number of repeating segments of from about 20 to about 200, and said conductive component is carbon black and where for said polyethylene glycol silicone phosphate a is 50 and b is 5.

19. An intermediate transfer member in accordance with claim 1 wherein said polysiloxane polymer is present and is a copolymer of a polyether and a polydimethylsiloxane, a copolymer of a polyester and a polydimethylsiloxane, a copolymer of a polyacrylate and a polydimethylsiloxane, or a copolymer of a polyester polyether, and a polydimethylsiloxane, and optionally, further including a release layer comprising at least one component selected from the group consisting of a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene, and tetrafluoroethylene, and mixtures thereof.

* * * * *